United States Patent [19]

Fontaine et al.

[11] Patent Number: 5,086,868

[45] Date of Patent: Feb. 11, 1992

[54] AUTOMOTIVE PROTECTION SYSTEM WITH A TELESCOPING PROTECTIVE SLEEVE BETWEEN BRAKE PEDAL AND BRAKE ACTUATOR

[75] Inventors: William G. Fontaine, 2676 SW. 15th St., Deerfield Beach, Fla. 33442; Vernon D. Beard, Lauderhill, Fla.

[73] Assignee: William G. Fontaine, Deerfield Beach, Fla.

[21] Appl. No.: 235,228

[22] Filed: Aug. 23, 1988

[51] Int. Cl.⁵ .............................................. B60R 25/08
[52] U.S. Cl. ........................................ 180/287; 74/608
[58] Field of Search ................. 74/608, 612, 615, 526; 180/287, 271

[56] References Cited

U.S. PATENT DOCUMENTS

| 1,792,750 | 2/1931 | Loughead | 188/196 R |
|---|---|---|---|
| 1,966,621 | 7/1934 | Folberth et al. | 180/287 X |
| 2,135,071 | 11/1938 | Folberth et al. | 192/0.01 |
| 2,201,125 | 5/1940 | Freeman | 192/0.01 |
| 2,409,288 | 10/1946 | Leland | 74/608 X |
| 2,588,815 | 3/1952 | Fasolino | 180/82 |
| 2,971,399 | 2/1961 | Roberts | 74/608 X |
| 3,114,580 | 12/1963 | MacDuff | 303/2 |
| 3,373,661 | 3/1968 | Reichard | 91/391 |
| 3,726,369 | 4/1973 | Esteves | 192/3 |
| 3,790,223 | 2/1974 | Fontaine | 303/19 |
| 3,830,330 | 8/1974 | Fontaine | 180/101 |
| 3,945,672 | 3/1976 | Wong | 293/5 |
| 4,106,601 | 8/1978 | Fischer | 192/3 S |
| 4,379,500 | 4/1983 | Kamino | 188/196 B |
| 4,446,950 | 5/1984 | Wise et al. | 180/287 X |
| 4,553,650 | 11/1985 | Warwick et al. | 192/4 A |
| 4,591,026 | 5/1986 | Nagano | 188/2 D |
| 4,682,062 | 7/1987 | Weinberger | 180/287 X |
| 4,754,255 | 6/1988 | Sanders et al. | 180/287 X |
| 4,777,377 | 10/1988 | Jeter | 180/287 X |

FOREIGN PATENT DOCUMENTS 0219127  11/1985  Japan .

Primary Examiner—David M. Mitchell
Assistant Examiner—Michael Mar
Attorney, Agent, or Firm—Oltman and Flynn

[57] ABSTRACT

Automotive vehicle protection system which includes a brake actuator, that is responsive to brake-activating and brake-deactivating signals generated by protective circuits in the vehicle. These circuits include a keypad for deactivating the brakes when a proper number is keyed into the keypad, a card reader for entering a proper number by means of a card, theft alarm circuits, engine monitor circuits and other miscellaneous circuits as may be found to be beneficial for protecting the vehicle.

12 Claims, 4 Drawing Sheets

BRAKE ACTIVATING INPUTS

A - VEHICLE ALARMS
   (a) DOOR ALARM
   (b) BUILT-IN THEFT ALARM
   (c) HOOD ALARM

B - ENGINE ALARM:
   (a) OIL PRESSURE LOW
   (b) OVER-HEATING

C - FALSE START ALARM
   (a) FROM KEY PAD CCT
   (b) FROM CARD READER CCT

D - STOP SIGNAL   (a) SEAT SWITCH ACTIVE

BRAKE DEACTIVATING INPUTS

P - PROPER KEYPAD START SIGNAL

Q - PROPER CARD READER START SIGNAL

R - IGNITION LOCK SIGNAL

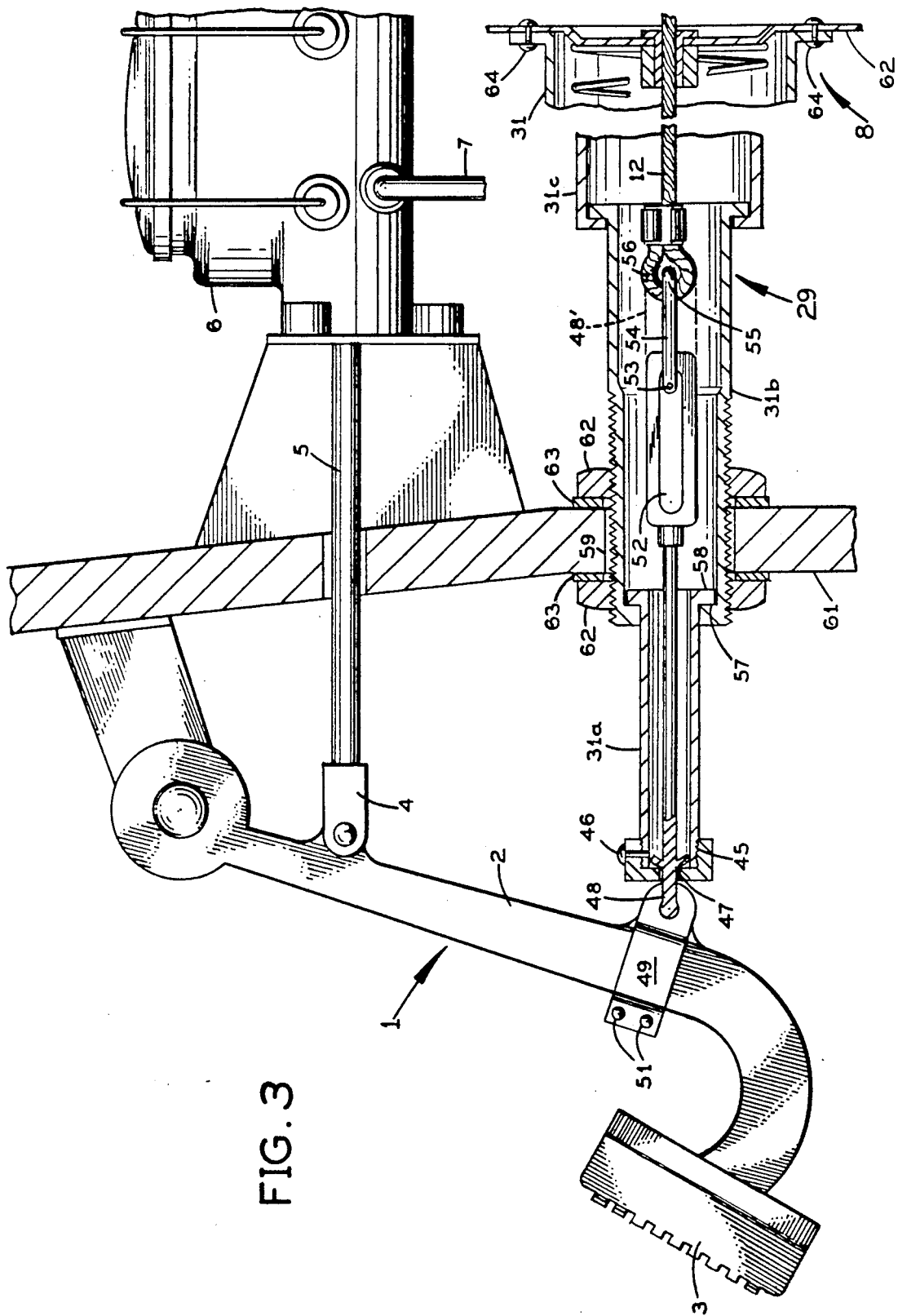

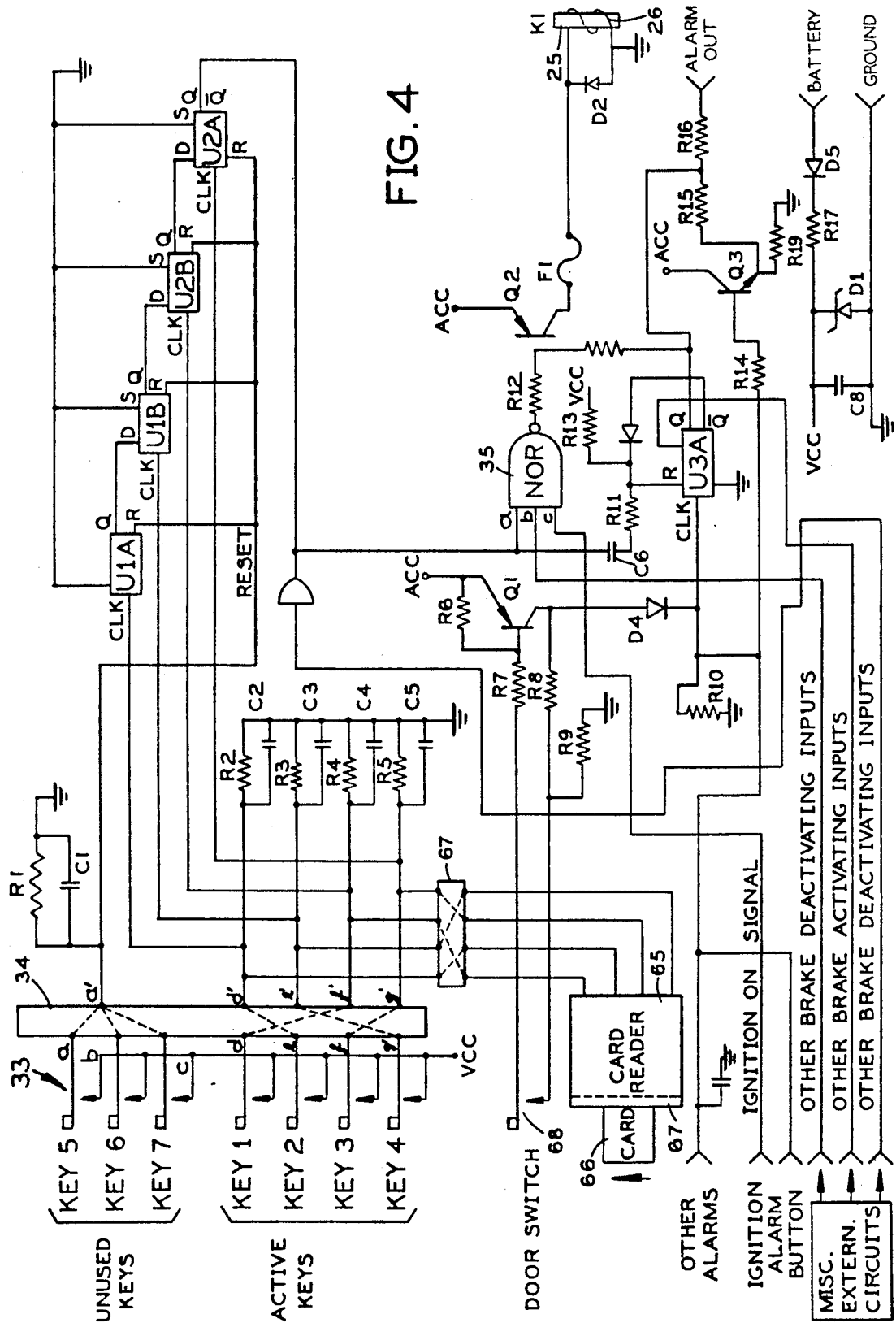

AUTOMOTIVE PROTECTION SYSTEM WITH A TELESCOPING PROTECTIVE SLEEVE BETWEEN BRAKE PEDAL AND BRAKE ACTUATOR

BACKGROUND

The invention relates to an automotive protection system for protecting a vehicle against unauthorized use, and more particularly a system having a telescoping protective sleeve between the brake pedal and the brake actuator for preventing unauthorized disabling of the protective system.

BACKGROUND AND PRIOR ART

Brake systems are known that automatically activate a vehicle's brakes under a number of operating conditions wherein safety and other considerations indicate that the vehicle should not be allowed to move. U.S. Pat. No. 3,830,330 shows an automatic parking and emergency brake system which applies the brakes when the engine is shut off or stalls and by which the brakes will become released automatically and immediately when the engine is started and then only when the driver's seat is occupied, and the accelerator pedal is operated. U.S. Pat. No. 3,790,223 discloses an automatic brake control system that includes an automatic vacuum-driven brake actuator coupled to the vehicle brakes and is controlled by various vehicle functions. The various known brake control arrangements however, do not address in a satisfactory manner the object of preventing a vehicle from being operated by unauthorized drivers.

The instant invention overcomes the problems of the known art by means of an automotive protection system that operates to engage the brakes when unauthorized individuals attempt to operate the vehicle and further includes means to prevent such individuals from disabling the system.

SUMMARY OF THE INVENTION

The invention provides an automotive protection system that has a brake actuator coupled by means of a coupling element to the vehicle brake pedal, and wherein a protective sleeve of a strong material is placed around the coupling element to prevent it from being cut or broken apart.

According to an important feature, the protective sleeve is arranged as a telescoping assembly of tubular sections so that the end of the sleeve located at the brake pedal can follow the motions of the brake pedal without impeding it.

In accordance with another feature, the coupling element is a flexible cable having a lost-motion link to facilitate the operation of the brake pedal by the driver without being impeded by the automatic brake system.

In accordance with a still further feature, the brake actuator includes a cannister which has a movable member in the form e.g. of a diaphragm or piston connected to the brake pedal through the coupling element, and is operated by a vacuum source under control of a vacuum control valve, which is in turn operated by an electric solenoid, driven by an electronic control system that has at least one brake-actuating input and at least one brake deactivating input.

In accordance with still another feature the brake deactivating input is provided by means of an ignition keylock, or an automatic card reader requiring a card with a special code to be inserted, or a keypad requiring a special code to be entered, while the brake activating input may be provided by a card having an invalid code being inserted, or an invalid code being keyed into the keypad, or by a vehicle theft alarm being set off or by other inputs making it desirable to prevent the vehicle from being operated.

Further objects and advantages of this invention will be apparent from the following detailed description of a presently preferred embodiment which is illustrated schematically in the accompanying drawings.

BRIEF DESCRIPTION OF THE DRAWING

FIG. 3 is an enlarged cross-sectional detail view of the brake pedal end of the protective sleeve and its connection with the brake pedal; and FIG. 4 is a detailed circuit diagram of the control circuit.

DESCRIPTION OF THE PREFERRED EMBODIMENTS

Figure 1:
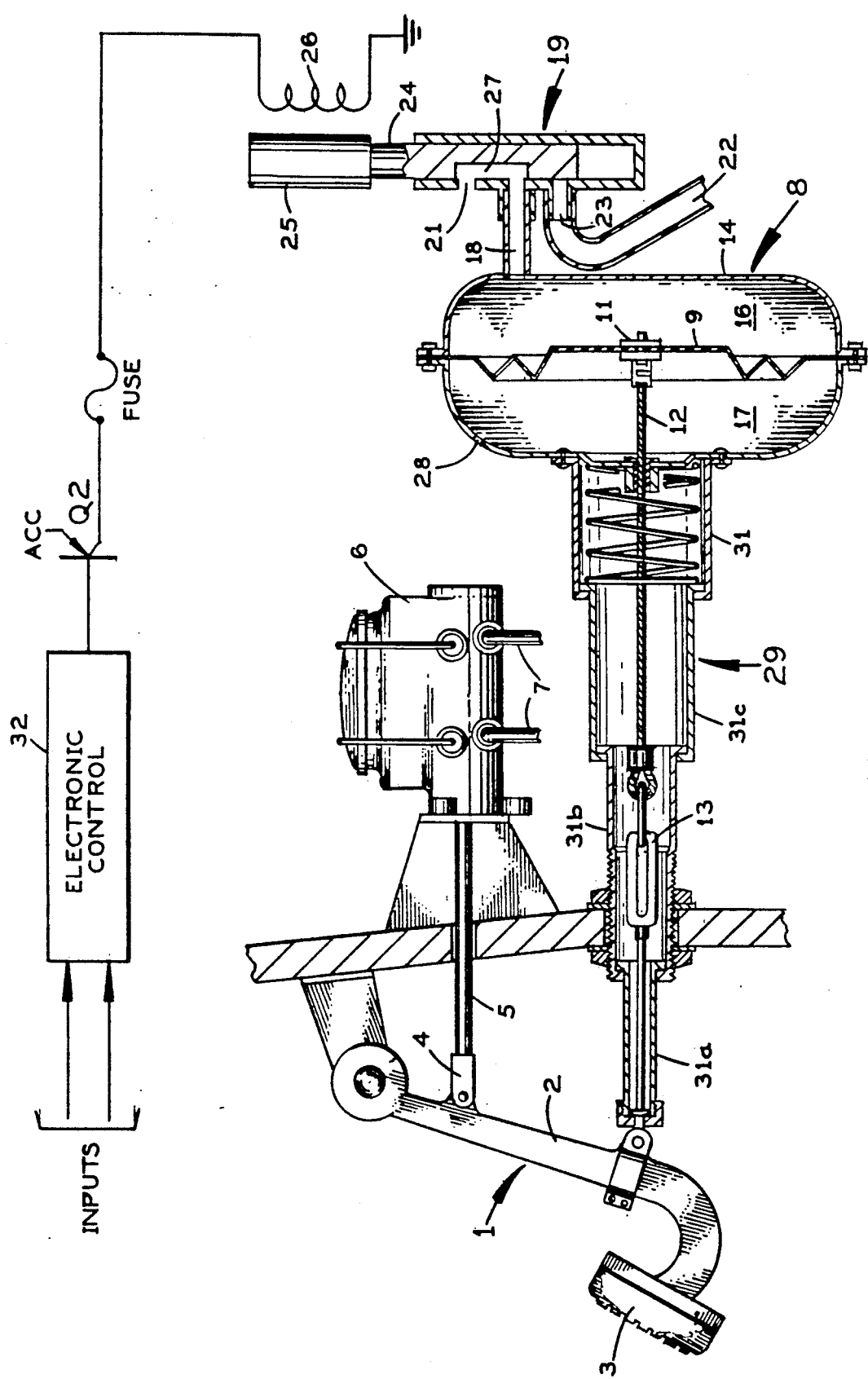
FIG. 1 is a diagrammatic elevational cross section of the invention showing its major parts.

In FIG. 1 a vehicle brake pedal 1, having a brake foot pad 3 and a brake arm 2 is connected in conventional manner by a clevis 4 and push rod 5 to a master cylinder 6, having hydraulic pipe outlets 7 for transmitting hydraulic fluid pressure to the vehicle brakes in response to foot pressure applied to the brake foot pad 3.

A vacuum driven brake actuator 8 has a movable member e.g. in the form of a diaphragm 9 attached at its middle 11 by suitable means such as a swaged joint or the like to a flexible steel cable 12, which is in turn connected via a lost motion link 13 to the brake pedal arm 2. The diaphragm 9 divides the interior space of the actuator housing or cannister 14 into a posterior space 17 and an anterior space 16. The anterior space 16 is connected to a vacuum control valve 19 having an output port 18, an input port 23 connected to a vacuum source 22, and another input port 21 connected to atmospheric pressure.

The vacuum control valve 19 has an axially movable spool 24 connected to an armature 25 of a solenoid 26. The spool 24 has a control space 27 which, in its upper position as shown, connects the input port 21 and the output port 18, and in the lower position of the spool, connects the input port 23 with the output port 18. The armature 25 is driven by a coil 26, which when energized by a transistor Q2 activates the coil 26, drawing upward the armature 25, placing the valve spool 24 in the upper position, as shown, wherein atmospheric pressure is connected to the anterior space 16 of the actuator 8. The posterior space 17 is connected, via a vent 28 to atmospheric pressure, so that the diaphragm 9 has the same pressure on each side and thus remains in its neutral center position in which no braking force is applied to the steel cable 12.

If the coil 26 is de-energized the armature 25 with spool 24 drops to its lower position in which the valve output port 18 is connected by the space 27 to the lower input port 23, which causes the vacuum source 22 to be connected to the anterior space 16, which in turn causes the diaphragm 9 to be drawn by the force of the vacuum to the right hand side, thus pulling the cable 12 and the brake pedal arm to the right, activating the vehicle brake system, via the push rod 5 and the master cylinder 6.

The steel brake cable 12 is housed in a protective sleeve 29 consisting of a plurality of sleeve sections 31, inserted telescopingly into each other so that the length of the sleeve is flexibly adjustable to the space available between the brake actuator 8 and the brake pedal 1. The sleeve sections 31 are made of a strong material, advantageously such as alloy steel or hard tempered steel, such that it is virtually impossible for a person intent upon disconnecting the cable to cut or saw through the sleeve wall. The sleeve 29 is constructed such that it is made virtually impossible to disassemble the sleeve section 31 without special tools in order to further secure the protective system, as described in more detail hereinbelow, in connection with FIG. 3.

Figure 2:
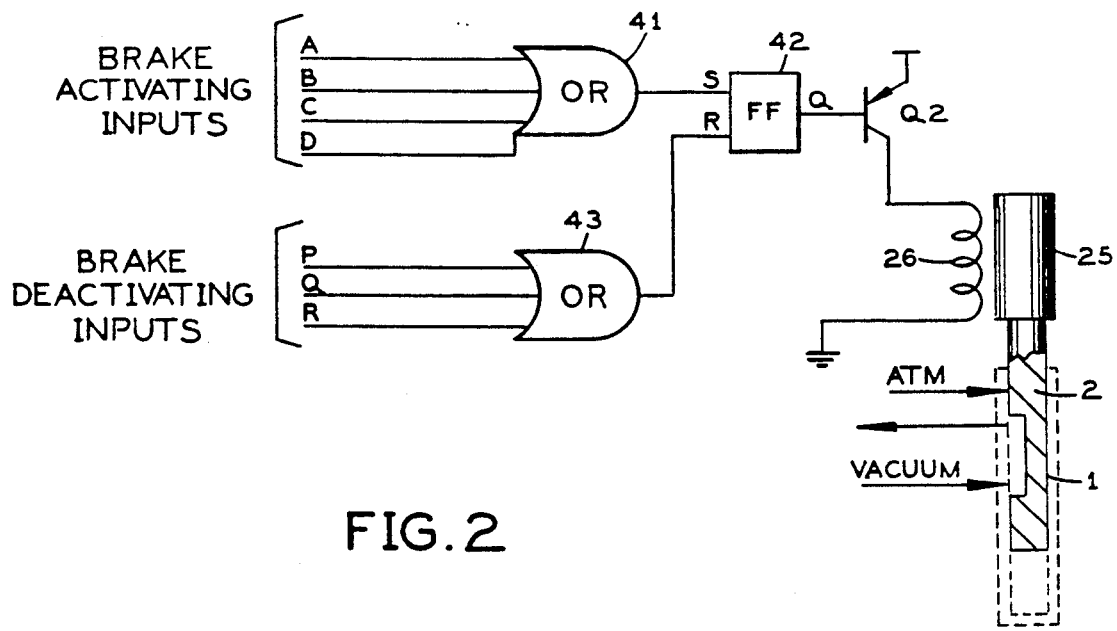
FIG. 2 is a simplified logic diagram of the electronic control part of the invention showing various exemplary input sources for activating and deactivating the brakes.

FIG. 2 is a simplified logic diagram of the control arrangement for the vacuum control valve 19. One group of inputs, each capable of providing a logic high condition, form the brake activating inputs, of which four are shown, namely a vehicle alarm A connected to any type of theft alarm system, including a door alarm and a hood alarm, that may be provided in the vehicle, and is capable of providing an output if a theft attempt is detected, an engine alarm B which may be any engine alarm condition, e.g. low oil pressure, overheating or the like, a false start alarm C, which provides an input in case an unauthorized attempt is made to start the vehicle, either from a key pad circuit, a card reader circuit or from an attempt to bypass the ignition system, or a stop signal D in case a condition is created that may require the vehicle to be stopped, e.g. from a seat switch in the driver's seat, indicating that the driver has vacated the seat. The brake activating inputs are combined in a logic OR-gate 41, having an output connected to the set input S of a flip-flop, having an output Q, which goes to logic high when set and turns off the gate of a pnp transistor Q2, which deenergizes the coil 26, which in turn cause the brakes to be activated as described above.

A group of brake deactivating inputs P,Q,R, respond to legitimate conditions for starting the vehicle, such as a proper keypad start signal or a proper card reader output signal, respectively from a keypad that must receive the proper key inputs or a card reader having a proper number stored thereon, e.g. on a magnetic stripe. The brake deactivating inputs each provide a logic high and are combined in another OR-gate 43 having an output connected to a reset input R of the flip-flop 42.

In operation, any brake activating input causes the flip-flop 42 to be set and activate the brakes, which stay activated as long as the flip-flop remains set. The set condition can only be cancelled by a reset input that resets the flip-flop 42, which in turn energizes the solenoid 26, pulling up the armature 25, causing atmospheric pressure to be connected to the brake activator 8, causing the brakes to be released.

FIG. 3 shows additional mechanical details of the brake activating arrangement. The protective telescoping sleeve 29 which encloses the coupling link 12, is terminated at its distal end 46 in an end cap 45, which is securely attached to the end of the most rearward telescoping link 31a, by means of rivets or case hardened non-removable screws 46, which can only be removed with considerable effort. The end cap 46 has a rearwardfacing aperture 47 which admits an end link 48 to protrude and reach a brake arm clamp 49, securely attached to the brake arm 2, also with rivets or non-removable screws 51. The end link 48 is prevented by cross arms 52, from extending with its arms 52 beyond the end cap 45. The end link 48 forms at its forward end 13 an elongate eye 52, which receives a clevis pin 53 through the ends of a clevis 50, attached at its forward end 55 to an eye-splice 56 of the steel cable 12, connected to the brake actuator 8. The elongate eye 52 provides a small amount of lost motion, equal to the length of the eye 52, so that when the brake is activated during normal driving by the driver, the end link can slide forward without pushing the cable 12 forward. The forward position of the end link 48 is indicated by a dashed line 48'. The next telescoping link 31b in forward direction receives the most rearward link 31a, and has a radially inwardly projecting flange 57, which abuts an outwardly projecting flange 58, formed at the forward end of the telescoping link 31a, which serves to prevent the rear link 31a from being drawn out of engagement with the next link 31b. The rear end of link 31b may advantageously be secured to an opening 59 cut in the firewall 61 of the vehicle, and secured to the firewall by washers 63 and nuts 62, threadedly attached to the link 31b. The forward end of link 31b may in similar telescoping manner engage still another next link 31c, seen in FIG. 1 but not in FIG. 3, or it may be directly attached to the rearward facing wall 62 of the brake actuator 8, again by rivets or non-removable screws, as seen in FIG. 3, depending upon the availability of space for mounting the brake actuator.

FIG. 4 shows the electronic control 32 in more detailed circuit diagram form. A keypad 33 consists of a number of active keys, e.g. four keys #1-#4 and a number of unused keys, e.g. keys #5-#7. In order to deactivate the brake system, a person must first operate the four active keys #1-#4 in a preselected sequence, which is determined by a cross-connect switch 34. The cross-connect switch 34 may advantageously be in the form of a programmable chip with fused link crosspoints or some other suitable type of variable switch, of which several types are well known. The selected cross-connect pattern is shown in dashed lines between the switch terminals a-g and a', d'-g'. The selected pattern shown requires the user to first push key #2, which sets a first flip-flop U1A of four flip-flops U1A, U1B, U2B and U2A, via the dashed line from terminal e to d'. Flip-flop U1A being set enables the second flip-flop U1B via connection Q-D. Next key #4 must be operated, which sets the second flip-flop U1B via dashed line from terminal g to e', which in turn enables the third flip-flop U2B, which requires key #1 to be pushed, setting flip-flop U2B, and in the same manner the fourth flip-flop U2A is set by operating key #3 via dashed line connection f-g. When the last flip-flop U2A is set, it causes it output Q to go high (logic one) and activate input a to NOR-gate 35. The NOR-gate 35 in turn presents a logic low (logic 0) at the input to resistor R12, connected to the gate of transistor Q2, causing the coil 26 of solenoid K1 to be energized, raising the armature 25, which in turn causes the brake system to be deactivated, as described above in connection with FIG. 1. In case one of the unused keys #5-#7 are operated, all flip-flops U1A-U2A are reset by a logic high being connected from high potential VCC through the respective key #5-#7, through terminal a', to all resets R of the flip-flops U1A-U2A, which causes the output of NOR-gate 35 to go high, unless another one of its inputs should be high at this time, which will cause the transistor Q2 to go non-conducting, de-energizing the coil 26 to drop the armature 25 and set the vacuum control valve 19 to energize the brake activator 8 by means of vacuum from the vacuum source 22 being connected to the anterior space 16, activating the vehicle's brakes.

A card reader 65 may be used as another device for deactivating the brakes by means of a card 66, e.g. of the magnetic stripe type which has a unique number stored magnetically, may be used to de-energize the brakes by placing the card in a slot 67 in the card reader 65. In this case a cross-connect switch 67 similar in construction to the cross-connect switch 34 described above is placed between the card reader 65 and the flip-flops U1A-U2A in order to provide a unique number code for the vehicle to be matched by the number stored in the magnetic card 66, in order to deactivate the brakes.

A door switch 68 serves to activate the brakes when a door is opened. When any door of the vehicle is opened the respective door switch 68 closes, turning transistor Q1 on, which causes the clock input CLK of the flip-flop U3A to go high, setting the flip-flop, which in turn causes output Q of the flip-flop U3A to go high, turning off transistor Q2, activating the brakes as described above. On entering the proper number on the keypad, keys 1-7, or inserting a proper card 66 in the card reader 65, the flip-flop U3A is again reset by flip-flop U2A being set, sending a high from its output Q via capacitor C6 and resistor R11 to pin R (reset) of flip-flop U3A, while at the same time setting pin a of NOR-gate 35 high.

The brake control circuit of FIG. 4 may be connected to various miscellaneous external circuits, e.g. engine circuits and others, shown as a block 72 which may provide brake activating or deactivating inputs a, b and c that may be connected into the circuit of FIG. 4 as shown.

In addition, external theft or fire alarms 69 from a vehicle alarm system may be connected into the circuit of FIG. 4 as shown.

We claim:

1. Automotive protective system comprising a brake actuator being responsive to at least one brake-activating signal and at least one brake-deactivating signal; a brake having a brake pedal; coupling means for coupling the brake actuator to the brake pedal; and intrusion-protection sleeve means enveloping said coupling means for preventing unauthorized disabling of the coupling means.

2. Automotive protective system according to claim 1 wherein said intrusion-protection sleeve means includes a plurality of telescoping tube sections, said tube sections extending from the brake pedal to the brake actuator.

3. Automotive protection system according to claim 2 wherein said brake actuator includes a cannister; a moving member airtightly dividing the interior of said cannister into an anterior and a posterior space, said moving member being in operative engagement with said coupling means; a vacuum valve having an output port in fluid communication with said anterior space, a first input port connected to atmospheric pressure and a second input port connected to a vacuum source; and valve control means being responsive to said brake-activating signal for fluidly connecting said output port with said second signal port, and to said brake-deactivating input for fluidly connecting said output port with said first input port.

4. Automotive protection system according to claim 3 wherein said coupling means include a flexible steel cable threaded through said telescoping tubular sections and connected at one end to said brake pedal and at the other end to said movable member.

5. Automotive protective system according to claim 3 wherein said valve control means include an electric solenoid; an electronic control system having an output connected to said solenoid, at least one input connected to said brake activating signal for activating said solenoid and at least one input connected to said brake deactivating signal for deactivating said solenoid.

6. Automotive protection system according to claim 1, wherein said brake activating signal includes at least one of a signal from a vehicle theft alarm system, a vehicle stop signal, and a reset signal from a start keypad; and said brake deactivating signal includes at least one of a clear signal from a card reader, a clear signal from a keypad, a clear signal from an engine monitor system and a clear signal from the vehicle ignition lock.

7. Automotive protection system according to claim 5, wherein said electronic control system includes a first OR-gate for combining said brake-deactivating signals; a second OR-gate for combining said brake-activating signals; and a flip-flop having inputs connected to outputs of said OR-gates for maintaining said OR-gate outputs.

8. Automotive protection system according to claim 1 wherein said coupling means include a lost-motion link.

9. Automotive protection system according to claim 8 wherein said lost motion link is enclosed within said intrusion-protection sleeve minus.

10. Automotive protection system according to claim 1 wherein said intrusion-protection sleeve means includes a most rearward telescoping tube section having an intrusion-protection end cap with an aperture for admitting said coupling means.

11. Automotive protection system according to claim 10, wherein said intrusion-protection end cap is attached by means of non-removable screws or rivets.

12. Automotive protection system according to claim 1 including a clamp secured by non-removable screws or rivets to said brake pedal.

* * * * *